UNITED STATES PATENT OFFICE.

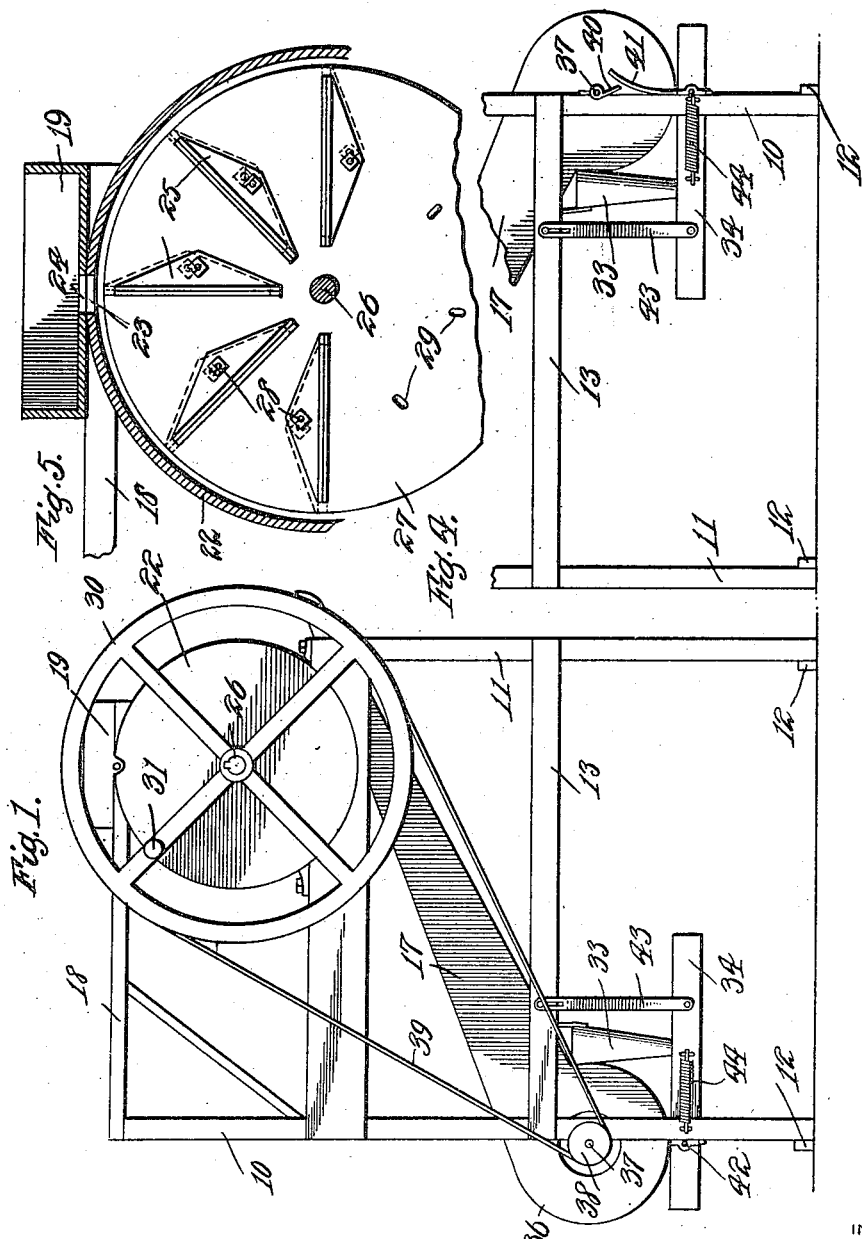

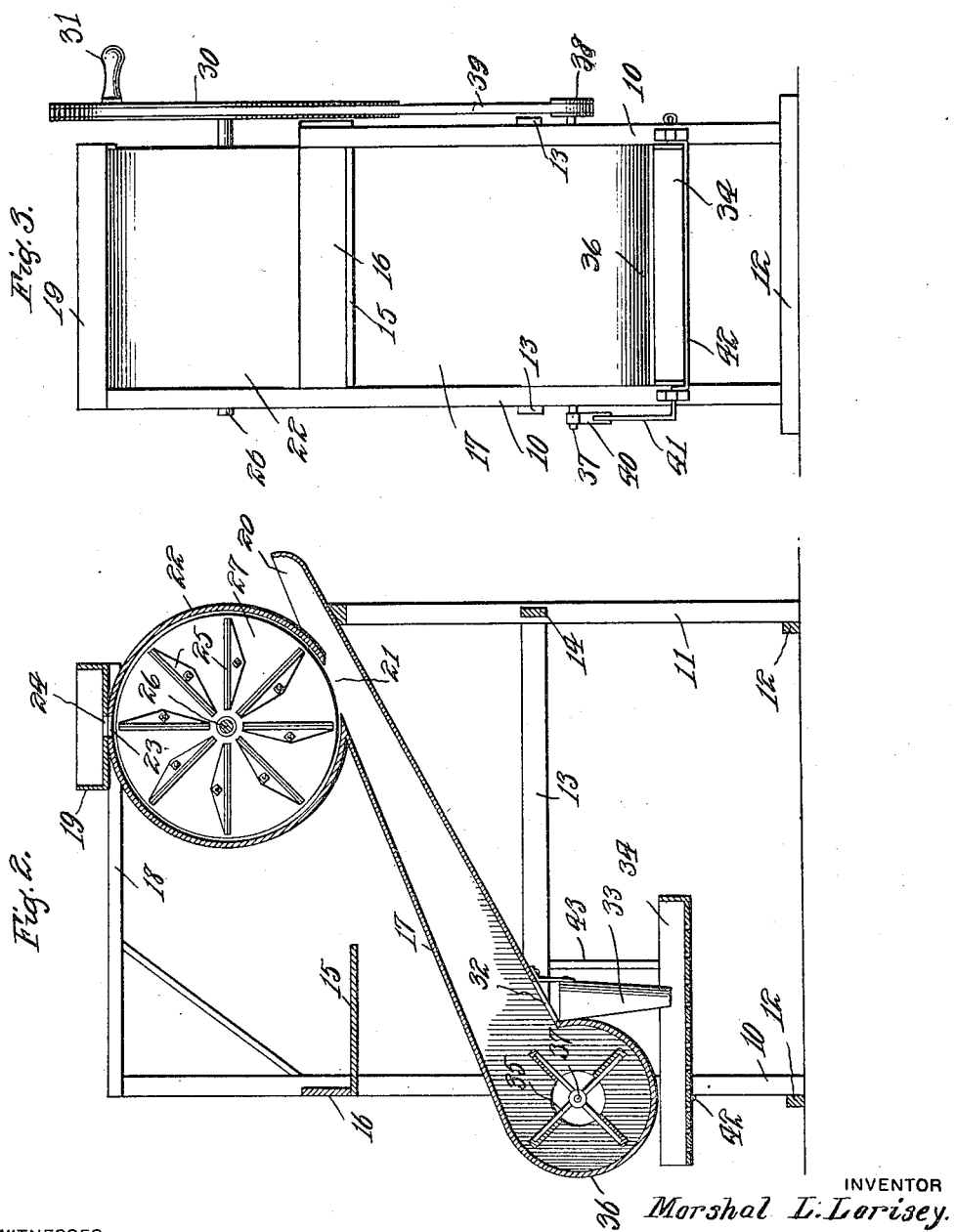

MARSHAL L. LARISEY, OF CAMILLA, GEORGIA.

PEANUT-SHELLING MACHINE.

1,284,852.  Specification of Letters Patent.  Patented Nov. 12, 1918.

Application filed January 30, 1917. Serial No. 145,494.

*To all whom it may concern:*

Be it known that I, MARSHAL L. LARISEY, a citizen of the United States, residing at Camilla, in the county of Mitchell and State of Georgia, have invented certain new and useful Improvements in Peanut-Shelling Machines, of which the following is a specification.

This invention relates to an improved peanut shelling machine and the principal object of the invention is to provide a peanut shelling machine having improved shelling mechanism and including a chute down which the peanuts are to pass and up which an air current is driven so that shells and trash passing into the chute with the peanuts will be separated from the peanuts and driven out through the upper end of the chute, the peanuts passing down into a tray.

Another object of the invention is to so mount this tray that broken and small peanuts may be separated from the larger ones.

Another object of the invention is to provide improved means for removing the peanuts from the shells, the peanut engaging blades being adjustably mounted according to the size of peanuts being shelled.

Another object of the invention is to so construct this machine that the fans may be driven from the fly wheel mounted upon the the shaft of the shell removing means.

This invention is illustrated in the accompanying drawings, wherein:—

Figure 1 is a view showing the improved machine in side elevation,

Fig. 2 is a view showing the machine in vertical section,

Fig. 3 is a view showing the machine in end elevation,

Fig. 4 is a fragmentary view in side elevation looking at the machine from the opposite side of Fig. 1, and Fig. 5 is an enlarged fragmentary sectional view through the shell removing portion of the machine.

This machine is provided with a frame having corner posts 10 and 11 connected by cross bars 12 at their lower ends and at points intermediate their height by the bars 13 and 14. A platform 15 is positioned as shown in Fig. 2 beneath the cross bar 16 and extends into the frame above the chute 17 and beneath the brackets or supports 18 for the hopper 19. This chute 17 extends at an incline as clearly shown in Figs. 1 and 2 and has its open upper end portion constituting a trash outlet 20 positioned above and beyond the outlet 21 of drum 22. This drum is connected with the frame and is provided with an inlet 23 which registers with the outlet 24 of hopper 19 so that peanuts placed in the hopper may pass into the drum for engagement by the blade 25 extending through the drum and positioned about the shaft 26 and adjustably connected with the head 27 by bolts 28 which pass through slots 29 formed in the head. It will thus be seen that by this construction, the blade may be adjusted to extend as close to the walls of the drum as desired. Therefore when in use, the peanuts will pass into the drum and the shells will be broken by the blade 25 upon the shaft 26 being rotated through turning the fly wheel 30 by means of handles 31. The shells and peanuts will pass out of the drum 22 and will fall into the chute 17 which chute is positioned at an incline so that the peanuts will have a tendency to roll down the chute and through the outlet 32 thereof into the funnel 33 positioned above the tray 34. A fan 35 is positioned in the fan housing 36 at the base of the chute 17 and when in operation, will direct an air current through the chute, the force of the air current being sufficient to blow the shells and other trash up through the shell outlet 20. The shaft 37 of this fan extends beyond the fan housing and is provided at one end with a pulley wheel 38 about which passes a belt 39 passing around the fly wheel or driving wheel 30. Therefore when the wheel 30 is turned to rotate the rotary shelling mechanism positioned in the drum, rotary movement will also be transmitted to the fan. It should be further noted that as the fan rotates, the trip 40 carried by the fan shaft 37 will strike the lever arm 41 of the tray agitating shaft 42. This tray 34 is loosely supported by the links 43 and is yieldably held in the position shown in the drawing by springs 44 so that when the trip 40 moves out of engagement with the lever 41, the pan or tray 34 will return to the normal position. This will cause the tray to be vibrated and the shelled peanuts deposited therein by funnel 43 will move across the tray toward the open end thereof. This tray has its bottom provided with perforations which may be slots if desired and will be of such size that broken peanuts or small peanuts will pass through them. Therefore the small or broken peanuts will be separated from the large ones to be used for planting. These perfect peanuts will pass out through the tray and into a suitable receptacle positioned beneath the open end of the tray.

It will thus be seen that there has been provided a machine for shelling peanuts which is so constructed that the shells may be broken without any of the peanuts being broken or otherwise damaged and that there has further been provided a machine so constructed that the shells may be separated from the nuts in the trough down which the shelled nuts are to pass and that there has further been provided, a machine so constructed that small or broken peanuts can be separated from the perfect ones.

What is claimed:—

A peanut shelling machine comprising a frame, a drum carried by said frame, and having an inlet and an outlet, a shaft extending through the drum, disks carried by the shaft within the drum and constituting heads, shelling arms positioned between said disks and adjustably connected therewith for movement radially of the disks, and means for rotating the shaft.

In testimony whereof I affix my signature in presence of two witnesses.

MARSHAL L. LARISEY.

Witnesses:
R. L. STRIPLING,
B. L. HOLTON.

Copies of this patent may be obtained for five cents each, by addressing the "Commissioner of Patents, Washington, D. C."